United States Patent
Chen et al.

(10) Patent No.: US 9,672,026 B2
(45) Date of Patent: Jun. 6, 2017

(54) LIGHT APP OFFLINE UPDATING METHOD, DEVICE AND TERMINAL

(71) Applicant: Xiaomi Inc., Beijing (CN)

(72) Inventors: Dingwei Chen, Beijing (CN); Guoshi Xu, Beijing (CN); Jinglong Zuo, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/657,602

(22) Filed: Mar. 13, 2015

(65) Prior Publication Data

US 2016/0019046 A1 Jan. 21, 2016

Related U.S. Application Data (63) Continuation-in-part of application No. PCT/CN2014/091755, filed on Nov. 20, 2014.

(30) Foreign Application Priority Data

Jul. 21, 2014 (CN) .......................... 2014 1 0346050

(51) Int. Cl.
*G06F 9/44* (2006.01)
*G06F 9/445* (2006.01)

(52) U.S. Cl.
CPC ............ *G06F 8/65* (2013.01); *G06F 9/44526* (2013.01)

(58) Field of Classification Search
None
See application file for complete search history.

(56) References Cited

U.S. PATENT DOCUMENTS

| 7,395,534 B2 | 7/2008 | Alcazar et al. |
| 7,574,481 B2 * | 8/2009 | Moore ............... G06F 8/68 707/999.202 |
| 8,078,294 B2 * | 12/2011 | Baier ............... G06Q 10/067 700/32 |
| 8,745,180 B2 * | 6/2014 | Cheng ............... G06F 17/30905 709/221 |

(Continued)

FOREIGN PATENT DOCUMENTS

| CN | 1564992 A | 1/2005 |
| CN | 101320353 A | 12/2008 |

(Continued)

OTHER PUBLICATIONS

Extended European Search Report dated Jan. 8, 2016 for European Application No. 15177077.3, 8 pages.
(Continued)

*Primary Examiner* — Evral E Bodden
(74) *Attorney, Agent, or Firm* — Brinks, Gilson & Lione (57) ABSTRACT

A light app offline updating method and a device and a terminal device are provided. When a terminal device obtains from a server, in case of detecting start-up operation of the light app, an offline configuration item corresponding to the light app, it processes, according to the offline configuration item, offline data in an offline partition of the light app, thus reaching the object of controlling elimination of offline data of the light app by a cloud server and providing users with web browsing under weak network signal or even no network signal, thereby improving user experience.

15 Claims, 4 Drawing Sheets

(56) References Cited

U.S. PATENT DOCUMENTS

| | | | |
|---|---|---|---|
| 8,924,348 B2 * | 12/2014 | Kallakuri | G06F 17/30575 707/620 |
| 8,953,448 B2 * | 2/2015 | Pharn | H04L 65/4076 370/234 |
| 9,201,794 B2 * | 12/2015 | Gill | G06F 12/0862 |
| 2007/0006021 A1 * | 1/2007 | Nicholson | G06F 9/4416 714/47.2 |
| 2007/0033569 A1 | 2/2007 | Davidson et al. | |
| 2008/0098093 A1 | 4/2008 | Simon et al. | |
| 2008/0104195 A1 | 5/2008 | Hawkins et al. | |
| 2008/0222628 A1 | 9/2008 | Batra et al. | |
| 2009/0320014 A1 | 12/2009 | Sudhakar | |
| 2011/0106774 A1 * | 5/2011 | Wickremesinghe | H04L 41/0856 707/695 |
| 2012/0185650 A1 | 7/2012 | Osuga | |
| 2013/0219383 A1 | 8/2013 | Hilerio et al. | |
| 2014/0122638 A1 | 5/2014 | Gao et al. | |
| 2015/0088858 A1 * | 3/2015 | Lang | G06F 3/0652 707/721 |
| 2016/0014229 A1 * | 1/2016 | Seedorf | H04L 47/2475 370/235 |

FOREIGN PATENT DOCUMENTS

| | | |
|---|---|---|
| CN | 101616132 A | 12/2009 |
| CN | 102867007 A | 1/2013 |
| CN | 103279429 A | 9/2013 |
| CN | 103581269 A | 2/2014 |
| CN | 103678393 A | 3/2014 |
| CN | 103810176 A | 5/2014 |
| CN | 103825938 A | 5/2014 |
| CN | 104021218 A | 9/2014 |
| CN | 104156233 A | 11/2014 |
| JP | 2011205183 A | 10/2011 |
| JP | 2005-018787 A | 1/2015 |
| RU | 2 432 608 C2 | 10/2011 |

OTHER PUBLICATIONS

Office Action dated Sep. 28, 2015 for Chinese Application No. 201410346050.5, 7 pages.

Office Action dated Jan. 20, 2016 for Korean Application No. 10-2015-7001084, 7 pages.

International Search Report issued Apr. 24, 2015 in International Application No. PCT/CN2014/091755.

Office Action dated May 16, 2016 for Russian Application No. 2015102144/08, 20 pages.

Office Action dated Oct. 25, 2016 for Japanese Application No. 2016-535340, 3 pages.

\* cited by examiner

LIGHT APP OFFLINE UPDATING METHOD, DEVICE AND TERMINAL

PRIORITY STATEMENT

This application is a continuation-in-part Application of International Application No. PCT/CN2014/091755, filed on Nov. 20, 2014, which is based on and claims priority to Chinese Patent Application No. 201410346050.5, filed on Jul. 21, 2014, the entire contents of both of which are incorporated herein by reference.

TECHNICAL FIELD

The present disclosure generally relates to a field of Internet technology, and more particularly, to methods, devices and terminals for offline updating a light app.

BACKGROUND

Applications available in application store, such as Apple's App Store and the Google Play marketplace are all "native" applications, in that developers built them using technology and code largely proprietary to those platforms. The code of the application is generally large, from several mega bites to hundreds of mega bites because the application has to a close system, carrying codes of all function it needs. Recently, a Light application is developed by using a browser-supported programming language and relies on a web browser to render the application. The light application (or Light APP, light app) is a search-and-play browser based application with no need to download. Light app attracts extensive attention due to its advantages of small RAM and/or ROM usage, less traffic consumption and simple and convenient to switch from another application, etc. Based on a browser platform, light app is able to operate successfully on multiple platforms and multiple terminal devices. Therefore, more and more users have chosen light app for web browsing or web access operation.

SUMMARY

The present disclosure provides methods and devices for offline updating a light app.

According to an aspect of the present disclosure, a terminal device may comprise a storage medium storing a light app and a set of instructions for providing offline updating of the light app, wherein the light app corresponds to a target webpage comprising a key element; and a processor in communication with the storage medium. When executing the set of instructions, the processor is directed to: connect the terminal device to a network; assign an offline partition in a cache of the terminal device to store offline data of the light app; when a download speed of the network is greater than a preset threshold value, automatically and periodically update the offline data by: obtaining the key element of the target webpage corresponding to the light app; and storing the key element in the offline partition as the offline data.

According to another aspect of the present disclosure, a method for providing offline updating of the light app may comprise: assigning, by the terminal device, an offline partition in a cache of the terminal device to store offline data of the light app, wherein the light app corresponds to a target webpage comprising a key element; connecting, by a terminal device, to a network; when a download speed of the network is greater than a preset threshold value, automatically and periodically updating, by the terminal device, the offline data by: obtaining the key element of the target webpage corresponding to the light app; and storing the key element in the offline partition as the offline data.

According to yet another aspect of the present disclosure, a processor-readable non-transitory storage medium may comprise a set of instructions. When being executed by a processor, the set of instructions directs the processor to perform acts of: assigning an offline partition in a cache of the terminal device to store offline data of the light app, wherein the light app corresponds to a target webpage comprising a key element; connecting to a network; when a download speed of the network is greater than a preset threshold value, automatically and periodically updating the offline data by: obtaining the key element of the target webpage corresponding to the light app; and storing the key element in the offline partition as the offline data.

It is to be understood that both the foregoing general description and the following detailed description are example and explanatory only and are not restrictive of the disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the invention. Instead, they are merely examples of apparatuses and methods consistent with aspects related to the invention as recited in the appended claims.

A light app is a browser-based type of application. It is a way for other apps to run without actually downloading or installing them. Using a browser as its kernel, the light app displays a webpage in a style of a client-side application. Taking a news application of a client-side application as an example, a news application server collects and/or captures news from news websites and/or from self-media (or "we media") platform, platforms for amateur and/or individual produced online contents—including blogs, microblogs, twitters, etc., and then collectively presents the news on the client-side application.

A difference between a client-side native application and a light application is that, to implement the client-side native application a client-side terminal device needs to download a large installation package (generally a few megabytes or even dozens of megabytes) and install the client-side application (e.g., the news application). However, to implement a light app the terminal device does not need to install a large installation package. The light app may only be an interface program (e.g., a "shell" application) necessary to send a user request, receive content from a server, and display the content using the browser. An installation package of the light app (e.g., news light app) may be as small as a few hundred kilobytes. Thus a light app may provide webpage browsing function with a display style like a client-side application. Because the light application occupies less memory, consumes less network traffic, and is easy to switch between different applications, it has received wide attention.

To manage light apps, a light app center embedded in the browser of the terminal device collects together most of the light applications that may be used in daily work and life. In the light app center, any kind of light apps may be added as desired, and each light app generally occupies hundreds of kilo bytes of memory. After a light app is added, an icon corresponding to the light application will be placed on the desktop of the terminal device.

Because of its web-based nature, light app usually needs a network connection to operate. In a place with no network connection or weak network connection, a user may not be able to use the light app. The present disclosure provides systems, devices, and methods for offline operating a light app.

Figure 4:
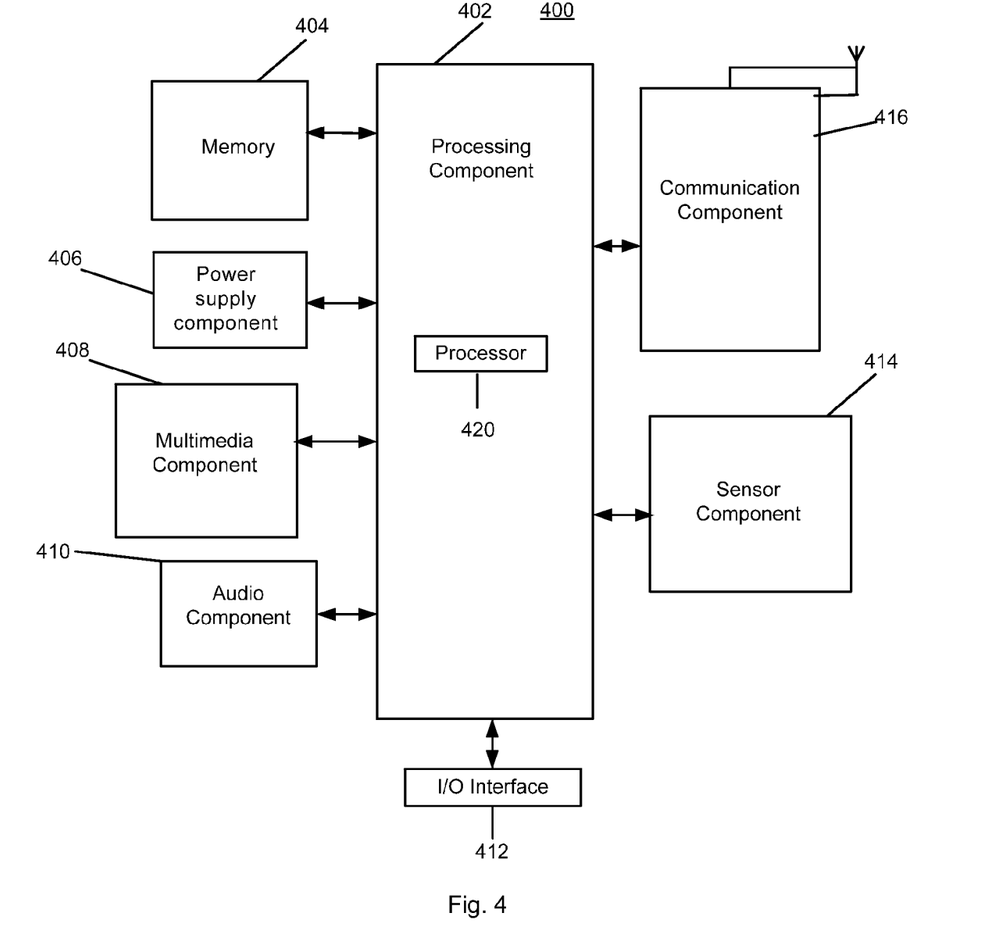
FIG. 4 is a block diagram of a terminal device according to an example embodiment.

FIG. 4 is a block diagram of a terminal device 400 for light app offline updating according to an example embodiment. For example, the terminal device 400 may be a mobile telephone, a computer, a digital broadcasting terminal device, a message transceiver device, a games console, a tablet device, a medical device, a fitness facility, a PDA (personal digital assistant) and the like.

Referring to FIG. 4, the terminal device 400 may include: a processor component 402, a memory 404, a power supply component 406, a multimedia component 408, an audio component 410, an input/output (I/O) interface 412, a sensor component 414, and a communication component 416.

The processor component 402 may control the overall operation of the terminal device 400, for example, display, telephone call, data communication, and operation associated with camera operation and record operation. The processor component 402 may include one or a plurality of processors 420 for executing instructions so as to complete steps of above method in part or in whole. In addition, the processor component 402 may include one or a plurality of modules for the convenience of interaction between the processor component 402 and other components. For example, the processor component 402 may include a multimedia module for the convenience of interaction between the multimedia component 408 and the processor component 402.

The memory 404 may be configured to store data of different types so as to support the operation of the terminal device 400. Examples of the data include any application program or approach directive for operation of the terminal device 400, including contact data, phonebook data, message, picture and video, etc. The memory 404 may be realized by volatile or non-volatile memory device of any type or combination thereof, for example, static random access memory (SRAM), electrically erasable programmable read-only memory (EEPROM), erasable programmable read only memory (EPROM), programmable read-only memory (PROM), read-only memory (ROM), magnetic memory, flash memory, magnetic disk or optical disk.

The memory 404 may store sets of instructions that implement methods introduced in the present disclosure, so that when the processor 420 executes the instructions, the processor is directed to operate the methods.

The power supply component 406 may provide power for components of the terminal device 400. The power supply component 406 may include a power management system, one or a plurality of power supplies, and other components associated with generation, management and power distribution of the terminal device 400.

The multimedia component 408 may include a screen between the terminal device 400 and a user and for providing an output interface. In some embodiments, a screen may include an LCD (Liquid Crystal Display) and a TP (Touch Panel). If the screen includes a TP, the screen may be realized as a touch screen for receiving input signal from users. The TP includes one or a plurality of touch sensors for sensing gestures on the touch panel, for example, touching and sliding, etc. The touch sensor not only can sensor trip boundary of touching or sliding, but also can detect the duration and pressure related to the touching or sliding operation. In some embodiments, the multimedia component 408 includes a front-facing camera and/or a rear-facing camera. When the terminal device 400 is under an operation mode, for example, capture mode or video mode, the front-facing camera and/or the rear-facing camera may receive external multimedia data. Each front-facing camera and rear-facing camera may be a fixed optical lens system or have focal length and optical zoom capacity.

The audio component 410 may be configured to output and/or input audio signal. For example, the audio component 410 includes a microphone (MIC); when the terminal device 400 is under an operation mode such as call mode, record mode and speech recognition mode, the microphone is configured to receive external audio signal. The audio signal received may be further stored in the memory 404 or sent out by the communication component 416. In some embodiments, the audio component 410 also includes a loudspeaker for outputting audio signal.

The I/O interface 412 may provide interface for the processor component 402 and peripheral interface modules, the peripheral interface modules may be a keyboard, a click wheel and buttons, etc. These buttons may include but not limited to: home button, volume button, start button and locking button.

The sensor component 414 may include one or a plurality of sensors for providing the terminal device 400 with state evaluation from all aspects. For example, the sensor component 414 may detect the on/off state of the terminal device 400, relative positioning of components, for example, the components are the displayer and keypads of the terminal device 400; the sensor component 414 also may detect the position change of the terminal device 400 or a component thereof, the presence or absence of users' touch on the terminal device 400, the direction or acceleration/deceleration of the terminal device 400, and temperature variation of the terminal device 400. The sensor component 414 may also include a proximity detector, which is configured to detect the presence of nearby objects in case of no physical touch. The sensor component 414 may also include an optical sensor, for example, CMOS (Complementary Metal Oxide Semiconductor) or CCD (Charge-coupled Device) image sensor for imaging. In some embodiments, the sensor component 414 may also include an acceleration sensor, a gyro sensor, a magnetic sensor, a pressure sensor, or a temperature sensor.

The communication component 416 may be configured to facilitate wired communication or wireless communication between the terminal device 400 and other equipment. The terminal device 400 is available for access to wireless network based on communication standards such as WiFi, 2G or 3G, or combination thereof. In an example embodiment, the communication component 416 receives by means of a broadcast channel the broadcast signal or broadcast-related information from external broadcast management systems. In an example embodiment, the communication component 416 also includes a near field communication (NFC) module for promoting short-range communication. For example, the NFC module may be realized on the basis of RFID (Radio Frequency Identification) Technology, IrDA (Infrared Data Association) Technology, UWB (Ultra-wide Bandwidth) Technology, BT (Bluetooth) Technology and other technologies.

In example embodiments, the terminal device 400 may be realized by one or a plurality of application specific integrated circuits (ASIC), digital signal processors (DSP), digital signal processing equipment (DSPD), programmable logic devices (PLD), field programmable gate arrays (FPGA), controllers, microcontrollers, microprocessors or other electronic components, configured to execute the above methods.

Merely for illustration, only one processor will be described in devices that execute operations and/or method steps in the following example embodiments. However, it should be note that the devices in the present disclosure may also include multiple processors, thus operations and/or method steps that are performed by one processor as described in the present disclosure may also be jointly or separately performed by the multiple processors. For example, if in the present disclosure a processor of a device executes both step A and step B, it should be understood that step A and step B may also be performed by two different processors jointly or separately in the device (e.g., the first processor executes step A and the second processor executes step B, or the first and second processors jointly execute steps A and B).

Figure 1:
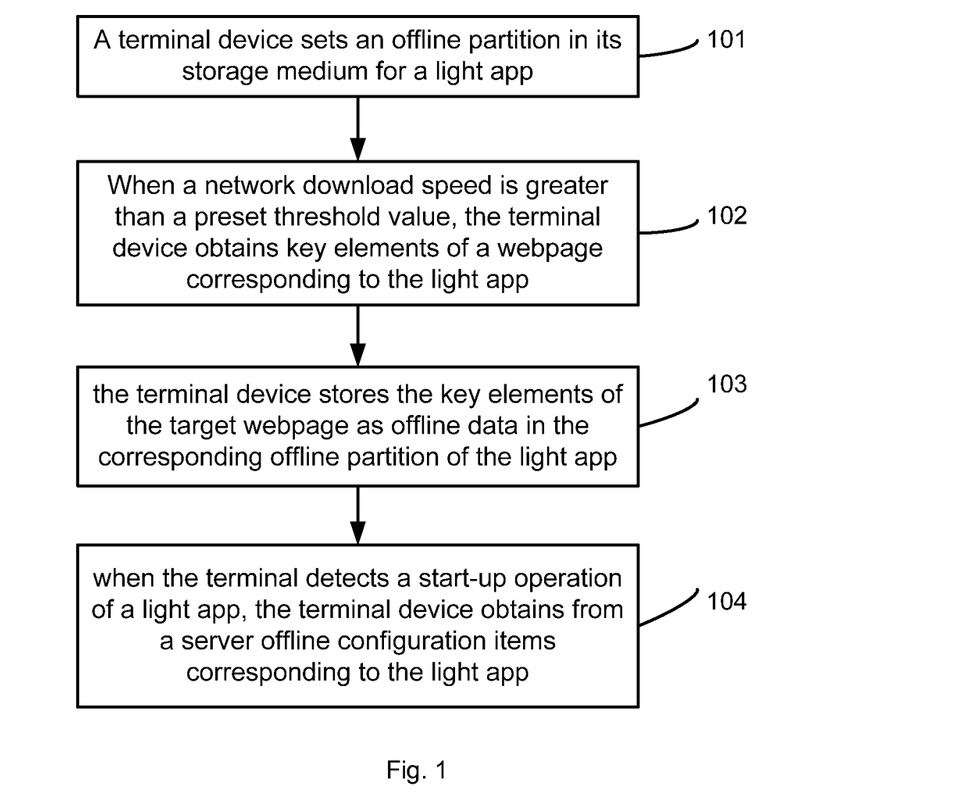
FIG. 1 is a flow chart showing a light app offline updating method according to an example embodiment.

FIG. 1 is a flow chart showing a light app offline updating method according to an example embodiment. The method may be implemented in a terminal device such as the device 400. The method may include the following operations.

In Operation 101, the terminal device assigns and/or sets an offline partition in its storage medium (e.g., ROM of the terminal device) for a light apps locally installed in the terminal device.

In Operation 102, when network download speed is greater than a preset threshold value, the terminal device downloads from the network and/or obtains key elements of a webpage corresponding to the light app.

In Operation 103, the terminal device stores the key elements of the target webpage as offline data in the corresponding offline partition of the light app.

In Operation 104, when the terminal detects a start-up operation of a light app, the terminal device obtains from a server offline configuration items corresponding to the light app.

The terminal device may process the offline data in the offline partition of the light app according to the offline configuration item.

Wherein, the offline configuration item is configured by the server. The server is a server in communication with the terminal device through the light app, and the offline configuration item is configured by the server.

In the method according to the embodiments of the present disclosure, the terminal may obtain from the server, in case of detecting start-up operation of the light app by the terminal device, an offline configuration item corresponding to the light app, and process, according to the offline configuration item, offline data in the offline partition of the light app. The server may be a could server. Accordingly, the cloud server may be able to control the terminal device to eliminate the offline data of the light app and provide a user of the terminal device with web browsing capability under weak network signal or even no network signal, thereby improving user experience.

The offline configuration item may comprise offline data elimination time information; and the offline data in the offline partition of the light app is processed by the terminal device according to the offline configuration item, comprising: Deleting offline data in the offline partition of the light app in a time interval corresponding to the offline data elimination time information.

The offline configuration item may also comprise offline data elimination space information; and the offline data in the offline partition of the light app is processed by the terminal device according to the offline configuration item, comprising: deleting offline data in an offline partition of the light app when offline data in an offline partition of the light app is beyond a data storage capacity corresponding to the offline data elimination space information.

The processing, according to the offline configuration item, of the offline data in the offline partition of the light app may comprise: encapsulating the offline configuration item and obtaining an encapsulating object; sending the encapsulating object to a custom elimination thread of the terminal device; and processing, according to the encapsulating object, the offline data in the offline partition of the light app by the elimination thread.

The obtaining of the key elements of a webpage corresponding to the light app may comprise: obtaining the key elements of the webpage corresponding to the light app by monitoring data packets flowing through the network.

The setting of the offline partition respectively for each light app may comprise: setting a first type offline partition for the light app if the light app is an image type light app; and setting a second type offline partition for the light app if the light app is a text type light app; wherein, storage space of the first type offline partition is greater than that of the second type offline partition.

The offline data elimination time of the image type light app may be greater than that of the text type light app.

Figure 2:
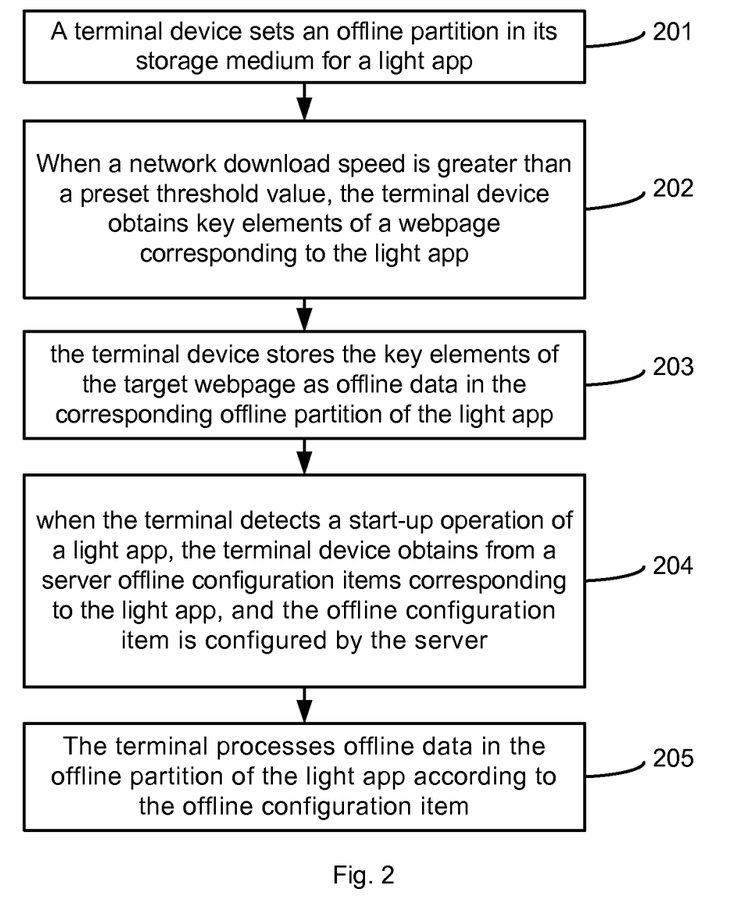
FIG. 2 is a flow chart showing a light app offline updating method according to an example embodiment.

FIG. 2 is a flow chart showing a light app offline updating method according to an example embodiment. The method may be implemented in a terminal device such as the device 400. The method may include the following operations.

In Operation 201, the terminal device assigns and/or sets an offline partition in its storage medium for a light app locally installed in the terminal device.

A light app is a browser-based type of application. Using a browser as its kernel, the light app displays a webpage in a style of a client-side application. Taking a news application of a client-side application as an example, a news application server collects and/or captures news from news websites and/or from self-media (or "we media") platform, platforms for amateur and/or individual produced online contents—including blogs, microblogs, twitters, etc., and then collectively presents the news on the client-side application. The difference between a client-side application and a light application is that, to implement the client-side application a client-side terminal device needs to download a large installation package (generally a few megabytes or even dozens of megabytes) and install the client-side application (e.g., the news application). However, to implement a light app the terminal device does not need to install a large installation package. The light app may only be a "shell" to send a user request, receive content from a server, and display the content using the browser. Thus an installation package of the light app (e.g., news light app) may be as small as a few hundred kilobytes. Thus a light app may provide webpage browsing function with a display style like a client-side application.

The terminal may have a plurality of light apps locally installed therein. In this operation, the terminal may set and/or assign an offline partition for each of the plurality of light app. The terminal device may respectively set offline partitions of different sizes for different types of light apps. For example, taking an image type light app and a text type light app as an example, an image occupies more storage space than a character or a word. Therefore, the terminal device may set and/or assign a first type offline partition for an image type light app, and a second type offline partition a text type light app; wherein, storage space of the first type offline partition is greater than that of the second type offline partition.

For image type light apps, the corresponding assigned offline partitions in the storage space may be the same. For example, the storage space size of each offline partition may be 512 M. For text type light apps, the corresponding assigned offline partitions in the storage space may be the same. For example, the storage space size of each offline partition may be 64 M. Alternatively, the terminal device may assign different sizes of store space for individual light apps, even though they are of the same type. The embodiments of the present disclosure do not make specific limitation to the sizes of offline partitions, as the case may be.

In addition, the terminal device may set and/or assign offline partitions for video type light apps in the same manner as above. For example, a third type offline partition may be set for the video type of light app, and storage space of the third type offline partition is greater than that of the first type offline partition. The embodiments of the present disclosure do not make specific limitation to types of light apps.

In Operation 202, when network download speed is greater than a preset threshold value, the terminal device downloads from the network and/or obtains key elements of a target webpage corresponding to the light app.

In this operation, the terminal device may be connected to a network. The network may be a wired or wireless network, such as Wifi, Internet, WAN, or LAN. The terminal device may first determine download speed of the network. When the download speed is greater than a preset threshold value, the terminal device may access a target webpage corresponding to the light app, obtains key elements on the target webpage, and download the key elements to the corresponding local offline partition. The terminal device may repeat this operation for each of the plurality of locally light app that stays active or designated by its user.

The target webpage may be one particular webpage corresponding with the light app, such as a webpage the light app is designated to open or extract contents therefrom, or may be a plurality of webpages the light app is designated to open or extract contents therefrom. The key elements of the target webpage may be key items thereon. These key items may comprise: trademarks or logos on the webpage, main navigation (e.g., site map), category navigation (on the relevant category page), header, main content of a webpage, a search box, space for self-promotion or space for advertising products or services of other companies.

In the embodiments of the present disclosure, the network speed of the current network where the terminal device is connected to is good if network download speed is greater than a preset threshold value, so that the terminal device may cache the webpage key elements. The key elements may be saved in a storage medium (e.g., the ROM) of the terminal device. The cached key element may be retrieved to the user when the network connection is week or not available. Wherein, the size of the preset threshold value for network connection may be 256 KBs or 512 KBs, etc. the threshold value for network connection may depend from actual network that the terminal device connects or may be defined by the user.

The terminal device may obtain key elements of the target webpage corresponding to the light app by sniffing technologies, i.e., monitoring data packets flowing through network by sniffer tools, thus obtaining key elements of a webpage corresponding to the light app according to data packets flowing through network. In addition to the sniffing technology, other acquisition technologies may be employed for obtaining key elements of a webpage corresponding to a light app, to which the embodiments of the present disclosure make no specific limitation.

Further, the terminal device may automatically obtain the key elements of the target webpage, i.e., the terminal device may obtain the key elements without receiving user instruction to open the webpage.

In Operation 203, the terminal device stores the key elements of the target webpage as offline data in the corresponding offline partition of the light app.

In the embodiments of the present disclosure, in Operation 201, the terminal device may set an offline partition for each light app installed locally. Therefore, after the key elements of the target webpage corresponding to a certain light app are obtained according to the foregoing Operation 202, the key elements may be cached as offline data in the offline partition corresponding to the light app.

It should be explained that as time goes on, if the terminal device does not clean the offline data, the offline date saved in each offline partition will accumulate, occupying more and more storage space of the terminal device. Moreover, some offline data cached in offline partitions may be out of date. For example, with respect to news light app, news websites may update webpage contents every few minutes; concerning users, they may be more inclined to obtaining the latest news. Therefore, news content cached previously may become out of date and may become less valuable. Accordingly, the terminal device may clean offline data in an offline partition periodically so as to save storage space of the terminal device. Specific cleaning process is introduced in the following Operation 204 and Operation 205.

In Operation 204, when the terminal detects a start-up operation of a light app, the terminal device may obtain from a server offline configuration items corresponding to the light app, wherein the server is a server in communication with the terminal device through the light app, and the offline configuration item is configured by the server to define and/or regulate an updating activity of the light app.

Wherein, the offline configuration item may be in an XML (Extensible Markup Language) data format or a json (JavaScript Object Notation) data format, to which the embodiments of the present disclosure make no specific limitation. Offline configuration items of each light app may be configured by a server corresponding to the light app. for example, the offline configuration items of a light app may be configured by a server of a developer of the light app. Then the offline configuration items are sent to a cloud server. For example, the cloud server may be a server connected to the terminal device what actual operates the light app. The offline configuration items of each light app may also be directly configured by the cloud server. Both the server corresponding to the light app and the cloud server may be able to communicate with the terminal device and send the configuration items to the terminal device when the light app is started.

An offline configuration item may comprise offline data elimination time information and offline data elimination space (or cleaning and/or updating space) information. For a light app, offline data elimination time information is used to determine and/or define a frequency and/or time interval of eliminating and/or updating offline data cached in a corresponding offline partition; offline data elimination space information is used to determine and/or define the maximum size of offline data cached in the corresponding offline partition before cleaning and/or updating the offline data in the corresponding offline partition. The offline data elimination space information may also be used by the terminal device to expand, according to the offline data, the size of the offline partition initially set. For example, for an image type light app, when the terminal initially sets its offline partition in Operation 201, the terminal device may allot storage space of 128 M by default (e.g., allotting the storage space according to a default value of the terminal device when no specific storage space information is defined in the light app or when the default value is recommended by the developer of the light app), but the space for updating offline data in an offline configuration item is 1 G. Therefore, the terminal device may expand, after receiving the offline configuration item of the image type light app, the corresponding offline partition from 128 M to 1 G. The expansion of the storage space for a light app may be based on actual updating need or may be set up by a user of the terminal device.

Generally, an image type website updates its images contents far slower than a text type website updates its textual contents. Therefore, the offline data elimination time interval of an image type light app generally is greater than that of a text type light app, i.e., the text type light app updates more frequently.

In the embodiments of the present disclosure, the terminal device may obtain the offline configuration item corresponding to a light app from the server by calling a Network Services Interface of the terminal device. In addition to the foregoing acquisition manner, the terminal device may also employ other manners to obtain the offline configuration item.

In Operation 205, the terminal device may process offline data in the corresponding offline partition of the light app according to the offline configuration item. For example, the terminal device may process the offline data in the offline partition by: encapsulating the offline configuration item to obtain an encapsulating object; sending the encapsulating object to a custom elimination thread; and processing, according to the encapsulating object, the offline data in the offline partition of the light app by the elimination thread.

Wherein, the elimination thread is a program running by the terminal device. The elimination thread may eliminate the offline data in the offline partition according to the offline data elimination time information and the offline data elimination space information contained in the encapsulating object.

Alternatively, the terminal device may adopt other method to eliminate the offline data.

After the terminal device obtains the offline configuration item corresponding to the light app, the terminal device may eliminate the corresponding offline data by: deleting the offline data in the offline partition of the light app periodically with an interval equal to the offline data elimination time information; and/or deleting offline data in an offline partition of the light app when the size of the offline data are beyond the data storage capacity corresponding to the offline data elimination space information.

For example, suppose the offline data elimination time is five minutes and the offline data elimination space is 128 M, all offline data in the offline partition corresponding to the light app are deleted every other five minutes so as to release storage spaces to cache the latest webpage contents to be obtained later. Also when the offline data in the offline partition of the light app is beyond 128 M, the terminal device deletes all offline data in the offline partition of the light app so as to release the storage spaces for caching the latest webpage contents to be obtained later.

After deleting the offline data in the offline partition of the light app, the terminal device may continue obtaining the key elements of the webpage corresponding to the light app if the current network status allows; and the key elements of the webpage are key elements updated recently.

In the method according to the embodiments of the present disclosure, the terminal may obtain from the server, in case of detecting start-up operation of the light app by the terminal device, an offline configuration item corresponding to the light app, and process, according to the offline configuration item, offline data in the offline partition of the light app. The server may be a could server. Accordingly, the cloud server may be able to control the terminal device to eliminate the offline data of the light app and provide a user of the terminal device with web browsing capability under weak network signal or even no network signal, thereby improving user experience.

Figure 3:
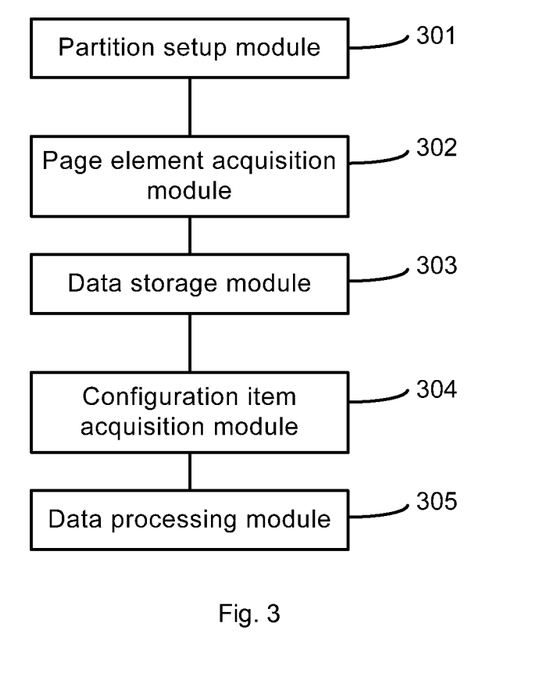
FIG. 3 is a block diagram showing a light app offline updating device according to an example embodiment.

FIG. 3 is a block diagram showing a light app offline updating device according to an example embodiment. The device may have a hardware structure as the device 400. Further, the device may comprise the following logic modules: a partition setup module 301, a webpage element acquisition module 302, a data storage module 303, a configuration item acquisition module 304, and a data processing module 305.

The partition setup module 301 may be configured to set an offline partition respectively for each light app installed in the device; the webpage element acquisition module 302 may be connected to the partition setup module 301 and may be configured to obtain, concerning any light app, key elements of a webpage corresponding to the light app when network download speed is greater than a preset threshold value; the data storage module 303 may be connected to the webpage element acquisition module 302 and may be configured to store key elements of the webpage as offline data in a corresponding offline partition; the configuration item acquisition module 304 may be connected to the data storage module 303 and may be configured to obtain from a server, in case of detecting start-up operation of the light app, an offline configuration item corresponding to the light app, the offline configuration item may be configured by the server; and the data processing module 305 may be connected to the configuration item acquisition module 304 and may be configured to process, according to the offline configuration item, the offline data in the offline partition of the light app.

The offline configuration item may comprise offline data elimination time information; and the data processing module may be configured to delete offline data in an offline partition of the light app in a time interval corresponding to the offline data elimination time information.

The offline configuration item may comprise offline data elimination space information, and the data processing module may be configured to delete the offline data in an offline partition of the light app when the offline data in the offline partition of the light app is beyond a data storage capacity corresponding to the offline data elimination space information.

The data processing module may be configured to encapsulate the offline configuration item and obtain an encapsulating object; send the encapsulating object to a custom elimination thread; and process, according to the encapsulating object, the offline data in the offline partition of the light app by the elimination thread.

The webpage element acquisition module may be configured to obtain key elements of a webpage corresponding to the light app by monitoring data packets flowing through the network.

The partition setup module may be configured to set a first type offline partition for the light app if the light app is an image type light app; and to set a second type offline partition for the light app if the light app is a text type light app; Wherein, storage space of the first type offline partition is greater than that of the second type offline partition.

The offline data elimination time of the image type light app is greater than that of the text type light app.

In the method according to the embodiments of the present disclosure, the terminal may obtain from the server, in case of detecting start-up operation of the light app by the terminal device, an offline configuration item corresponding to the light app, and process, according to the offline configuration item, offline data in the offline partition of the light app. The server may be a could server. Accordingly, the cloud server may be able to control the terminal device to eliminate the offline data of the light app and provide a user of the terminal device with web browsing capability under weak network signal or even no network signal, thereby improving user experience.

With regard to the device in the above embodiment, detailed description of specific manners for carrying out operations of modules has been made in the embodiment related to the method; no detailed illustration will be made herein.

In example embodiments, the present disclosure may also provide a non-transitory computer-readable storage medium including instructions. For example, the storage medium may be the memory 404 and may include a set instructions for providing offline updating of the light app. The set of instructions may be executed by the processors 420 of the terminal 400 so as to achieve the above methods. For example, the non-transitory computer-readable storage medium may be ROM, RAM (random access memory), CD-ROM (Compact Disc Read-Only Memory), magnetic tape, floppy disk and optical data storage device, etc.

For example, when the set of instructions in the storage medium is executed by the processor of the terminal device 400, the terminal device 400 may execute the light app offline updating method comprising: setting an offline partition respectively for each light app; obtaining, concerning any light app, key elements of a webpage corresponding to the light app when network download speed is greater than a preset threshold value; storing key elements of the webpage as offline data in a corresponding offline partition; obtaining from a server, in case of detecting start-up operation of the light app, an offline configuration item corresponding to the light app, the offline configuration item being configured by the server; and processing, according to the offline configuration item, offline data in an offline partition of the light app.

The offline configuration item may comprise offline data elimination time information; and the offline data in the offline partition of the light app may be processed according to the offline configuration item, comprising: deleting offline data in an offline partition of a light app every interval corresponding to offline data elimination time information.

The offline configuration item may comprise offline data elimination space information; and the offline data in the offline partition of the light app may be processed according to the offline configuration item, comprising: deleting offline data in an offline partition of the light app when offline data in an offline partition of the light app is beyond a data storage capacity corresponding to the offline data elimination space information.

The processing, according to the offline configuration item, of the offline data in the offline partition of the light app may comprise: encapsulating the offline configuration item and obtaining an encapsulating object; sending the encapsulating object to a custom elimination thread; and processing, according to the encapsulating object, offline data in an offline partition of the light app by means of the elimination thread.

The obtaining of the key elements of the webpage corresponding to the light app may comprise: obtaining key elements of a webpage corresponding to the light app by monitoring data packets flowing through the network.

The setting of the offline partition respectively for each light app may comprise setting a first type offline partition for the light app if the light app is an image type light app; and setting a second type offline partition for the light app if the light app is a text type light app; wherein, storage space of the first type offline partition being greater than that of the second type offline partition.

The offline data elimination time of the image type light app may be greater than that of the text type light app.

In the method according to the embodiments of the present disclosure, the terminal may obtain from the server, in case of detecting start-up operation of the light app by the terminal device, an offline configuration item corresponding to the light app, and process, according to the offline configuration item, offline data in the offline partition of the light app. The server may be a could server. Accordingly, the cloud server may be able to control the terminal device to eliminate the offline data of the light app and provide a user of the terminal device with web browsing capability under weak network signal or even no network signal, thereby improving user experience.

Based on the above introduction, the devices, systems, and methods in the present disclosure provide a new technology in the field of light app by automatically updating content of a light app when the terminal device has network connection, so that a user may still use the light app when there is no network connection available. The devices, systems, and methods also improve functions of the terminal device as they enable the terminal device with new capability of operating the light app. As a result, the devices, systems, and methods enhance user experiences of the light app.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as example only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

The invention claimed is:

1. A terminal device comprising:
a storage medium storing a light app and a set of instructions for updating the light app for use offline, wherein the light app corresponds to a target webpage comprising a key element; and
a processor in communication with the storage medium, wherein when executing the set of instructions, the processor is directed to:
assign an offline partition in a cache of the terminal device to store offline data of the light app, wherein the offline partition comprises at least one of a first type offline partition when the light app is an image type light app or a second type offline partition when the light app is a text type light app, and wherein storage space of the first type offline partition is greater than storage space of the second type offline partition, and wherein an offline data elimination time that corresponds to the image type light app is longer than an offline data elimination time that corresponds to the text type light app;
connect the terminal device to a network;
determine a download speed of the network, and in response to determining the download speed of the network is greater than a preset threshold value, automatically and periodically update the offline data by:
extracting the key element from the target webpage corresponding to the light app, wherein the key element is a data object extractable from the target webpage; and
storing the key element in the offline partition as the offline data;
detect a start-up operation for executing the light app;
in response to detecting the start-up operation of the light app, obtain, from a server, an offline configuration item associated with the light app that defines an updating activity of the light app;
update the offline data according to the offline configuration item; and
in response to determining the download speed of the network is less than the preset threshold value during the start-up operation:
retrieve the key element from the offline partition; and
utilize the key element retrieved from the offline partition to execute the light app.

2. The terminal device according to claim 1, wherein the offline configuration item comprises offline data elimination time information to define an updating period of the light app; and
to periodically update the offline data, the processor is further directed to delete the offline data in the time interval.

3. The terminal device according to claim 1, wherein the offline configuration item comprises offline data elimination space information to define a maximum size of the offline data in the offline partition; and
to periodically update the offline data, the processor is further directed to delete the offline data when the offline data is beyond the maximum size.

4. The terminal device according to claim 1, wherein the key element of the target webpage is obtained by monitoring data packets flowing through the network; and
the key element comprises at least one of a trademark or logo on the target webpage, a main navigation on the target webpage, a category navigation on the target webpage, a header on the target webpage, main content of the target webpage, a search box on the target webpage, a space for self-promotion on the target webpage, and a space for advertising products or services on the target webpage.

5. A method for updating a light app for use offline, the method comprising:
assigning, by a terminal device, an offline partition in a cache of the terminal device to store offline data of the light app, wherein the light app corresponds to a target webpage comprising a key element, wherein the offline partition comprises at least one of a first type offline partition when the light app is an image type light app or a second type offline partition when the light app is a text type light app, and wherein storage space of the first type offline partition is greater than storage space of the second type offline partition, and wherein an offline data elimination time that corresponds to the image type light app is longer than an offline data elimination time that corresponds to the text type light app;
connecting, by the terminal device, to a network;
determining, by the terminal device, a download speed of the network, and in response to determining the download speed of the network is greater than a preset threshold value, automatically and periodically updating, by the terminal device, the offline data by:
extracting the key element from the target webpage corresponding to the light app, wherein the key element is a data object extractable from the target webpage; and
storing the key element in the offline partition as the offline data;
detecting a start-up operation for executing the light app;
in response to detecting the start-up operation of the light app, obtaining, by the terminal device, from a server, an offline configuration item associated with the light app that defines an updating activity of the light app;
updating, by the terminal device, the offline data according to the offline configuration item; and
in response to determining the download speed of the network is less than the preset threshold value during the start-up operation:
retrieving the key element from the offline partition; and
utilizing the key element retrieved from the offline partition to execute the light app.

6. The method according to claim 5, wherein the offline configuration item comprises offline data elimination time information to define an updating period of the light app; and
the periodically updating of the offline data comprises deleting the offline data in the time interval.

7. The method according to claim 5, wherein the offline configuration item comprises offline data elimination space information to define a maximum size of the offline data in the offline partition; and the periodically updating of the offline data comprises deleting the offline data when the offline data is beyond the maximum size.

8. The method according to claim 5, wherein the key element of the target webpage is obtained by monitoring data packets flowing through the network; and the key element comprises at least one of a trademark or logo on the target webpage, a main navigation on the target webpage, a category navigation on the target webpage, a header on the target webpage, main content of the target webpage, a search box on the target webpage, a space for self-promotion on the target webpage, and a space for advertising products or services on the target webpage.

9. A processor-readable non-transitory storage medium, comprising a set of instructions that when executed by a processor direct the processor to perform the acts of:

assigning an offline partition in a cache of a terminal device to store offline data of a light app, wherein the light app corresponds to a target webpage comprising a key element, wherein the offline partition comprises at least one of a first type offline partition when the light app is an image type light app or a second type offline partition when the light app is a text type light app, and wherein storage space of the first type offline partition is greater than storage space of the second type offline partition, and wherein an offline data elimination time that corresponds to the image type light app is longer than an offline data elimination time that corresponds to the text type light app;

connecting the terminal device to a network;

determining a download speed of the network, and in response to determining the download speed of the network is greater than a preset threshold value, automatically and periodically updating the offline data by:
extracting the key element from the target webpage corresponding to the light app, wherein the key element is a data object extractable from the target webpage; and
storing the key element in the offline partition as the offline data;

detecting a start-up operation for executing the light app;

in response to detecting the start-up operation of the light app, obtaining from a server an offline configuration item associated with the light app that defines an updating activity of the light app;

updating the offline data according to the offline configuration item;

in response to determining the download speed of the network is less than the preset threshold value during the start-up operation:
retrieving the key element from the offline partition; and
utilizing the key element retrieved from the offline partition to execute the light app.

10. The storage medium according to claim 9, wherein the offline configuration item comprises offline data elimination time information to define an updating period of the light app; and the periodically updating of the offline data comprises deleting the offline data in the time interval.

11. The storage medium according to claim 9, wherein the offline configuration item comprises offline data elimination space information to define a maximum size of the offline data in the offline partition; and the periodically updating of the offline data comprises deleting the offline data when the offline data is beyond the maximum size.

12. The storage medium according to claim 9, wherein the key element of the target webpage is obtained by monitoring data packets flowing through the network; and the key element comprises at least one of a trademark or logo on the target webpage, a main navigation on the target webpage, a category navigation on the target webpage, a header on the target webpage, main content of the target webpage, a search box on the target webpage, a space for self-promotion on the target webpage, and a space for advertising products or services on the target webpage.

13. The terminal device of claim 1, wherein the preset threshold value depends on a type of network to which the terminal device is connected.

14. The terminal device of claim 1, wherein the target webpage comprises a plurality of webpages that the light app is designated to extract the key element from.

15. The method of claim 5, wherein the preset threshold value depends on a type of network to which the terminal device is connected.

* * * * *